(12) United States Patent
Reinecke et al.

(10) Patent No.: US 8,620,686 B1
(45) Date of Patent: Dec. 31, 2013

(54) METHOD FOR DYNAMIC GEOSPATIAL ANALYSIS WITH COLLABORATIVE DECISION MAKING

(71) Applicant: Geodimensional Decision Group, LLC, Washington, DC (US)

(72) Inventors: Gregory T. Reinecke, Washington, DC (US); Scott R. Stafford, Washington, DC (US); Baldwin H. Tom, Washington, DC (US)

(73) Assignee: Geodimensional Decision Group, LLC, Washington, DC (US)

( * ) Notice: Subject to any disclaimer, the term of this patent is extended or adjusted under 35 U.S.C. 154(b) by 0 days.

(21) Appl. No.: 13/858,874

(22) Filed: Apr. 8, 2013

(51) Int. Cl.
  *G06Q 10/00* (2012.01)
  *G06Q 50/00* (2012.01)
(52) U.S. Cl.
  USPC ............................................... 705/2; 705/3
(58) Field of Classification Search
  USPC ...................................................... 705/2–3
  See application file for complete search history.

(56) References Cited

U.S. PATENT DOCUMENTS

| 7,865,836 | B1* | 1/2011 | Sperlongano et al. | 715/771 |
| 2004/0073459 | A1* | 4/2004 | Barthell | 705/2 |
| 2005/0264412 | A1* | 12/2005 | Levesque et al. | 340/517 |
| 2008/0177571 | A1* | 7/2008 | Rooney et al. | 705/2 |
| 2012/0215455 | A1* | 8/2012 | Patil et al. | 702/19 |
| 2013/0120140 | A1* | 5/2013 | Patil et al. | 340/539.12 |

\* cited by examiner

*Primary Examiner* — Michael Fuelling
(74) *Attorney, Agent, or Firm* — Buskop Law Group, PC; Wendy Buskop

(57) ABSTRACT

A computer assisted method that enables multiple users with client devices to simultaneously connect via a network to a processor and data storage with computer instructions to use the computer instructions to identify contextual awareness situations, identify contextual awareness compliance specifications, calculate data specifications to meet the compliance specifications, collect raw data related to the contextual awareness, compare the collected raw data with the data specifications to meet compliance specifications, generate a visualization of the contextual awareness for defined time periods including times in the future, and formulate an integrated composite decision plan that accelerates decision making for compliance regarding the contextual awareness by stakeholders.

16 Claims, 6 Drawing Sheets

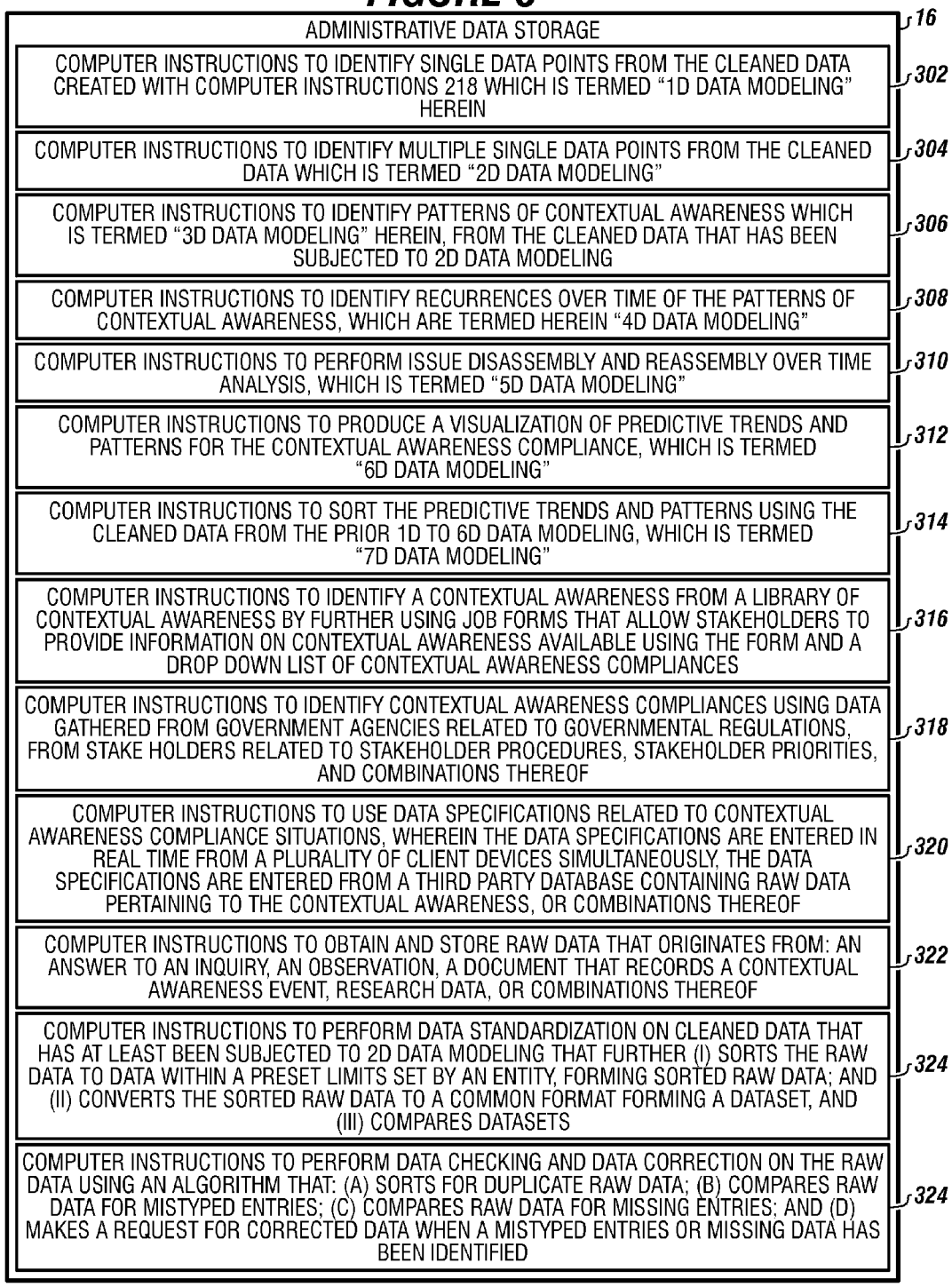

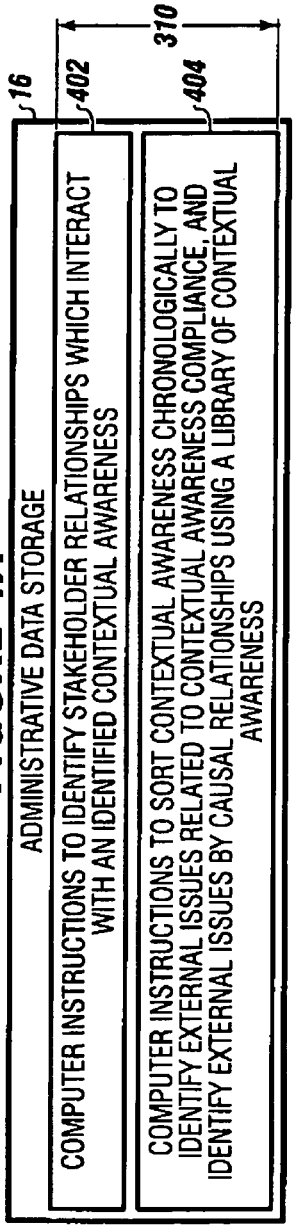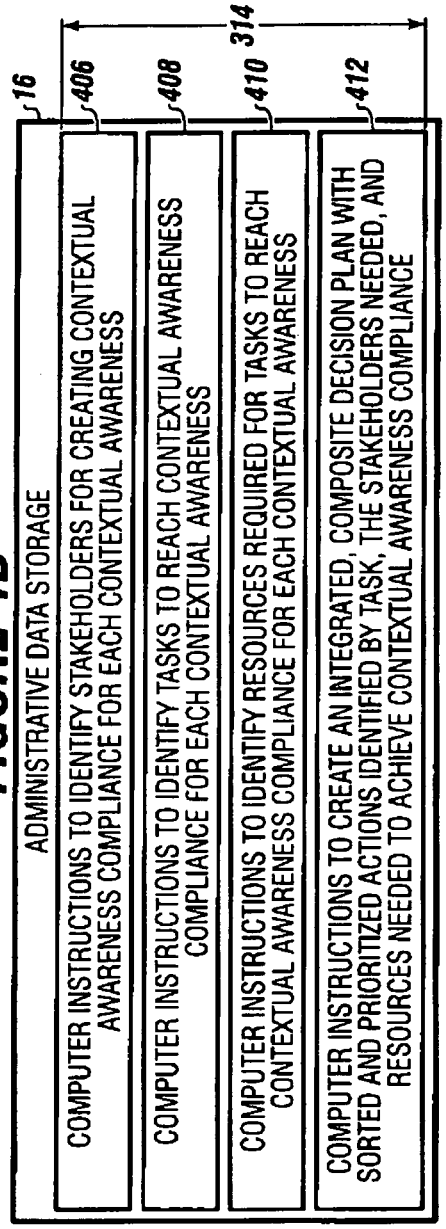

METHOD FOR DYNAMIC GEOSPATIAL ANALYSIS WITH COLLABORATIVE DECISION MAKING

FIELD

The present embodiments relate to a computer assisted method that enables multiple users with client devices to simultaneously connect via a network and use computer instructions to identify contextual awareness situations, identify contextual awareness compliance specifications, calculate data specification to meet the compliance specification, collect raw data, compare the raw data against the data specification to meet compliance, generate a visualization of the contextual awareness for real time and at a date in the futures, and formulate an integrated composite decision plan to accelerate decision making for compliance by stakeholders.

BACKGROUND

A need exists for a method that collects information based on user insights, relevant data and background expertise resulting in the creation of fact-based decisions.

A further need exists for a method to verify decisions based on values assigned to soft side issues, such as non-quantitative issues, which are difficult to assess because there are no standard values to compile.

The present embodiments meet these needs.

BRIEF DESCRIPTION OF THE DRAWINGS

The detailed description will be better understood in conjunction with the accompanying drawings as follows:

FIG. 3 depicts the data storage for containing the computer instructions usable with the method.

FIG. 4A depicts disassembly and re-assembly sequences of computer instructions.

FIG. 4B shows the detail of computer instructions used by the method.

Figure 1:
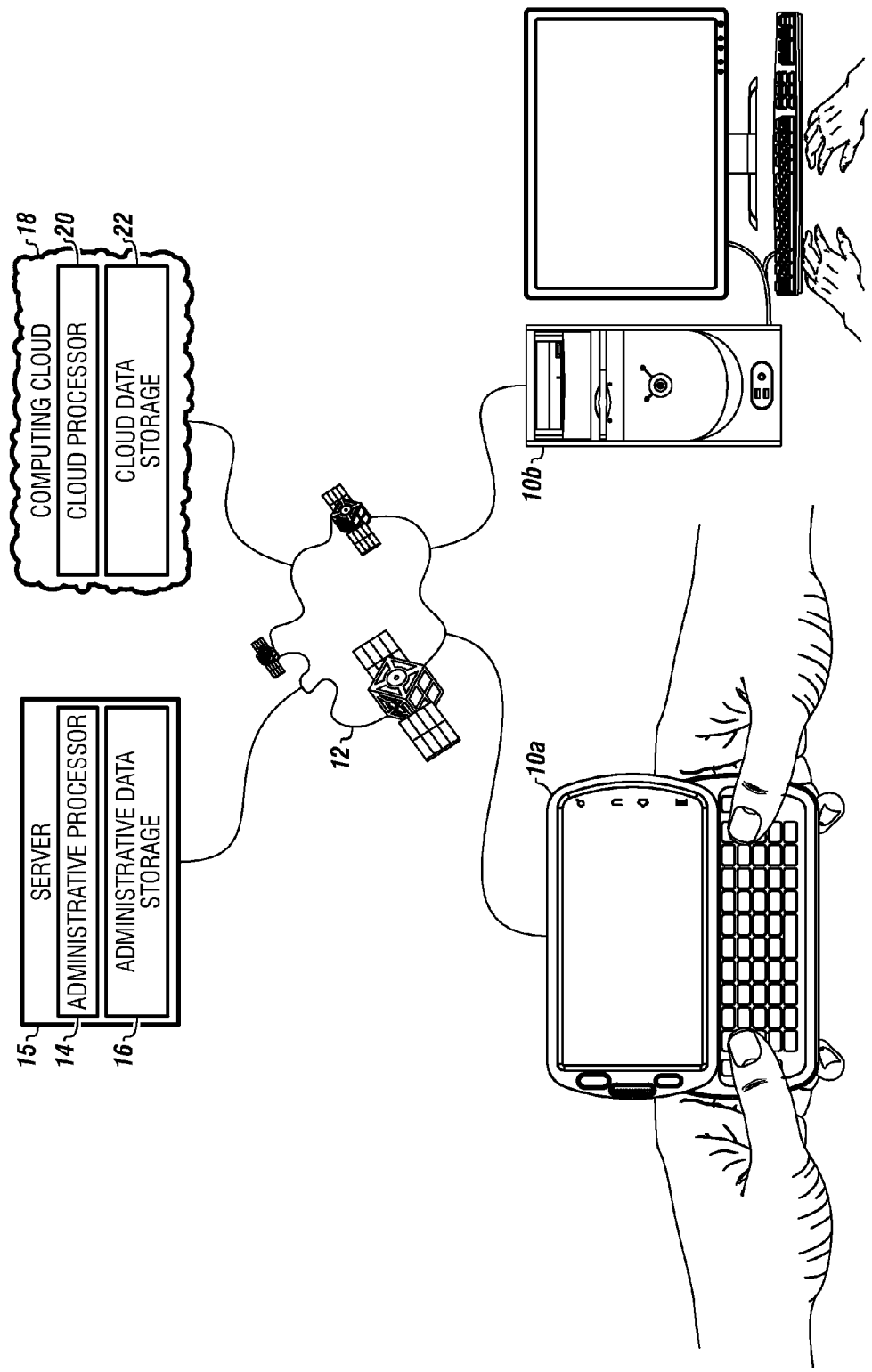
FIG. 1 depicts a system usable by the method according to one or more embodiments.

The present embodiments are detailed below with reference to the listed Figures.

DETAILED DESCRIPTION OF THE EMBODIMENTS

Before explaining the present computer implemented method in detail, it is to be understood that the method is not limited to the particular embodiments and that it can be practiced or carried out in various ways.

The computer implemented method can enable multiple users with client devices to simultaneously connect via a network to a processor and data storage with computer instructions to identify contextual awareness situations.

Contextual awareness can be awareness about lack of medical facilities to handle aging people within a certain zip code. Contextual awareness can be awareness of a need for additional bridges across a river due to an increase in house construction.

The computer assisted method can use a system interface that is resident on an administrative server, which can be a computer connected to a network, allowing users with client devices, such as cell phones, to connect to an administrative processor and an administrative data storage with computer instructions resident therein to identify from a drop down menu, a contextual awareness, and then request information on compliance for that contextual awareness and project what the contextual awareness will look like if nothing is changed, or if change occurs without planning for a date in the future.

The user can request the projection concerning the future date be formed as a visualization which can be pushed back to the client device for viewing by multiple users simultaneously.

The client device can request that data specifications be developed for compliance for a designated date in the future in view of the projection, and be provided visualization on those data specifications which can be pushed to the client device from the system interface or directly from the administrative server.

The client devices can be used to input raw data to provide more information on the projection and for the data specifications for compliance.

The administrative processor can use computer instructions to store this raw data and then clean and data check the raw data for accuracy, duplications, and other information.

The cleaned data can be used to generate a visualization of the contextual awareness for defined time periods including times in the future, and computer instructions can use the cleaned data to formulate an integrated composite decision plan that accelerates decision making for compliance regarding the contextual awareness by stakeholders and the integrated composite decision plan can be pushed to the client devices from the administrative server for use.

Computer instructions can be used to perform a series of steps, referred to herein as "7D modeling," to present options on how a contextual awareness situation should be handled in order to improve the lives of stakeholders, other people, and other entities by facilitating the making of decisions that optimize funding, construction, or installation of an operational facility, a service based institution, or a manufacturing institution, such as specialty hospitals, schools, police/fire stations, and manufacturing facilities.

The present embodiments refer to a method for identifying situations and making decisions that save money by reducing the time needed for stakeholders, politicians, health care providers, and others to make decisions; or by optimizing locations of facilities needed at a date in the future.

The method can include using computer instructions to perform a sequence of steps that improve analysis efficiencies resulting from the use of multiple datasets to support a decision.

The computer assisted method improves the environment through optimal siting of facilities, by reducing anticipated traffic congestion and helping reduce potential pollution from automobile travel to facilities not sited optimally in view of a contextual awareness.

The embodiments relate to a computer assisted method for dynamic mapping to integrate collaborative data enabling decision-making using at least one client device, a network connected to at least one processor, and a data storage.

The computer assisted method can use a system interface to simultaneously receive and transmit raw data between client devices in individual client device protocols and at least one processor, which can be inside a server either connected to a network or in a computing cloud.

The computer assisted method can enable the administrative processor to receive raw data in multiple client device protocols simultaneously.

The computer assisted method can use computer instructions to: (i) identify a contextual awareness from a library of contextual awareness; (ii) identify contextual awareness compliance situations for an identified contextual awareness; (iii) form data specifications for the contextual awareness compliance situations for the identified contextual awareness; (iv) input raw data that matches data specifications to the system interface; (v) perform data standardization, data checking, and data correction on the raw data forming cleaned data; and (vi) perform 7D data modeling on the cleaned data.

The library of contextual awareness can be contained in the administrative data storage.

The term "administrative data storage" refers to a hard disk, data storage in a computing cloud, portable data storage, or combinations thereof, which can communicate with at least one processor.

The term "administrative processor" as used herein refers to a processor for a computer or other device that has computing capabilities and interconnectivity to a network.

The term "client device" as used herein can refer to a cell phone, a laptop, a tablet, or another device with integrated client device processor, client device data storage and a display for connecting to a network, wirelessly or in a wired status. Each client device has a unique client device protocol.

The term "cleaned data" as used herein refers to raw data resident in the administrative data storage which have been filtered, sorted, checked for duplicates using computer instructions, and formed so the resultant cleaned data can be compared one from another.

The term "collaborative data" as used herein refers to data that is collected or generated by a group of individuals relevant to specific interests of users and valuable only to them but when assembled with other unique data form a broader perspective and provide greater overall value in decision making.

The term "community promulgated standards" refers to non-governmental guidelines and standards provided by living groups as a means to maintain a common set of behaviors, actions, and activities.

The term "contextual awareness" as used herein, means understanding the environment, wherein the data are placed or processed when making a decision, such as understanding the number and geographical location of stroke victims in the African American male community for making a decision about the placement of specialty clinics to treat stroke victims.

The term "data specifications" for the contextual awareness compliance situations includes the type of data being utilized including spreadsheets, documents, database tables or digital map files and how the data is organized within each format. Data is provided on a case by case basis and can include any type of data, such as location or address, age, ethnicity, gender, or population.

The term "direction of events related to contextual awareness" refers to the expectation that the contextual awareness will not stay static and will migrate to new locations. For example, stroke victims may increase as people migrate toward high density, stressful living conditions or live in newer communities that have less access to appropriate health care facilities.

The term "duration of contextual awareness" refers to a time element in which the contextual awareness activities continue to be present. For example, this can be the number of years projected before a new stroke clinic would need to be built given the contextual awareness that a need exists.

The term "dynamic mapping" as the term is used herein refers to the means in which data is displayed visually, graphically, or in table form and updated to best portray a decision such as identifying sources for disease by overlaying individuals stricken with typhoid on a map of the city.

For example, "dynamic mapping" can look at movement from one location to another location, such as in a typhoid example, there may be a cluster of patients on one corner of Main Street of a given city with typhoid and then on day 5, people on Main Street and Broad Street have typhoid. The dynamic mapping can show that the disease is moving from place to place over time.

The term "entities" as used herein refer to government agencies, political groups, associations, stakeholders, other end users, or other human beings that can use the method and system as described herein.

The term "frequency of similar or different contextual awareness" refers to the numbers of times the contextual awareness occurs, such as the numbers of individuals who report to a clinic with the same disease.

The term "geo-demographic zones" as the term is used herein refers to places where people live in terms of their geography together with their socioeconomic status. For example, a geo-demographic zone can be a low-income area, or the area surrounding an industrial facility, such as a coal mining area.

The term "industry standards" refers to published information, usually from an organization from the industry which catalogs and categorizes activities and guidelines within the industry.

The term "integrated composite decision plan" refers to a set of organized activities derived by use of this embodiment that provides a blueprint to act on the optimal decision. An example of an integrated composite decision plan produced according to the invention is shown in the Figures.

The term "network" as used herein refers to a satellite network, a cellular network, a local area network, a wide area network, a computing cloud, or combinations thereof.

The phrase "prevalence of contextual awareness by geographic area" refers to the multiple times the contextual awareness occurs within an area, such as enumerating the number of incidences of people with cholera within one mile of a water well.

The term "quasi-governmental body standards" refers to an entity that receives some funding from the government, but is operated mostly independent of government control.

The term "raw data" as used herein refers to the input of data which has not been filtered, or otherwise modified that is real time data, empirical data or both types of data.

The term "resources" as used herein refers to materials, facilities, transportation vehicles, people, and money needed to accomplish a task.

The term "stakeholder" refers to entities that have a vested interest in the compliance for the contextual awareness because they either will be fined for inaction, achieving compliance is within their job description, or the entity controls funding. The term stakeholder can refer to one or several entities: (i) entities or people who cause the action, (ii) entities or people who are impacted by the action, (iii) entities or people politically involved in facilitating action, and (iv) entities or people who fund the action.

The term "tasks" as used herein for achieving contextual awareness compliance refers to action steps to be performed in a specified period of time, which include but are not limited to those activities needed to make a decision about the contextual awareness compliance. For example, a task can be to determine the number of influenza diagnosed patients who have visited a clinic in the past seven days in order to provide an adequate amount of drugs to treat them.

The term "zones formed using spatial relationships" refers to an assemblage of data groups based on similarities in distribution patterns.

The computer assisted method can enable multiple users with client devices to simultaneously connect via a network to a processor and data storage with computer instructions to use the computer instructions to identify contextual awareness situations, identify contextual awareness compliance specifications, calculate data specifications to meet the compliance specifications, collect raw data related to the contextual awareness, compare the collected raw data with the data specifications to meet compliance specifications, generate a visualization of the contextual awareness for defined time periods including times in the future, and formulate an integrated composite decision plan that accelerate decision making for compliance regarding the contextual awareness by stakeholders.

It should be noted that the method enables continuous updating, and continuous production of dynamic maps for a given contextual awareness which can be pushed to client devices continuously over a network.

The method can produce a product of both a visualization of need and a visualization of an integrated composite decision plan to address the need.

The visualizations can be created by computer instructions that show movement and direction of trends for a specific contextual awareness.

The invention can use computer instructions that (i) perform dynamic mapping of the contextual awareness to create geographic and geo-dimensional regions which expand and contract as raw data is input to the data storage and (ii) perform 7D modeling as a sequence of steps.

In embodiments, the method can provide predictions and projections of a contextual awareness on maps.

Turning now to the Figures, FIG. 1 shows an embodiment of equipment usable by the method.

The method can enable collaborative data decision-making by entities using at least one client device, such as first client device 10*a* and second client device 10*b*.

The client devices 10*a* and 10*b* can communicate with a network 12 that can be connected to at least one administrative processor 14, which can be in a server 15.

The administrative data processor can be given instructions on steps to perform, maps to create, and calculations to undertake using computer instructions in the administrative data storage 16.

In embodiments, the network 12 can connect to a computing cloud 18, which can contain at least one cloud processor 20 that can communicate with at least one cloud data storage 22. The method can be totally resident in the cloud data storage.

In other embodiments, the method can use computer instructions that can be resident partially in the cloud data storage and partially resident within the administrative data storage.

Figure 2:
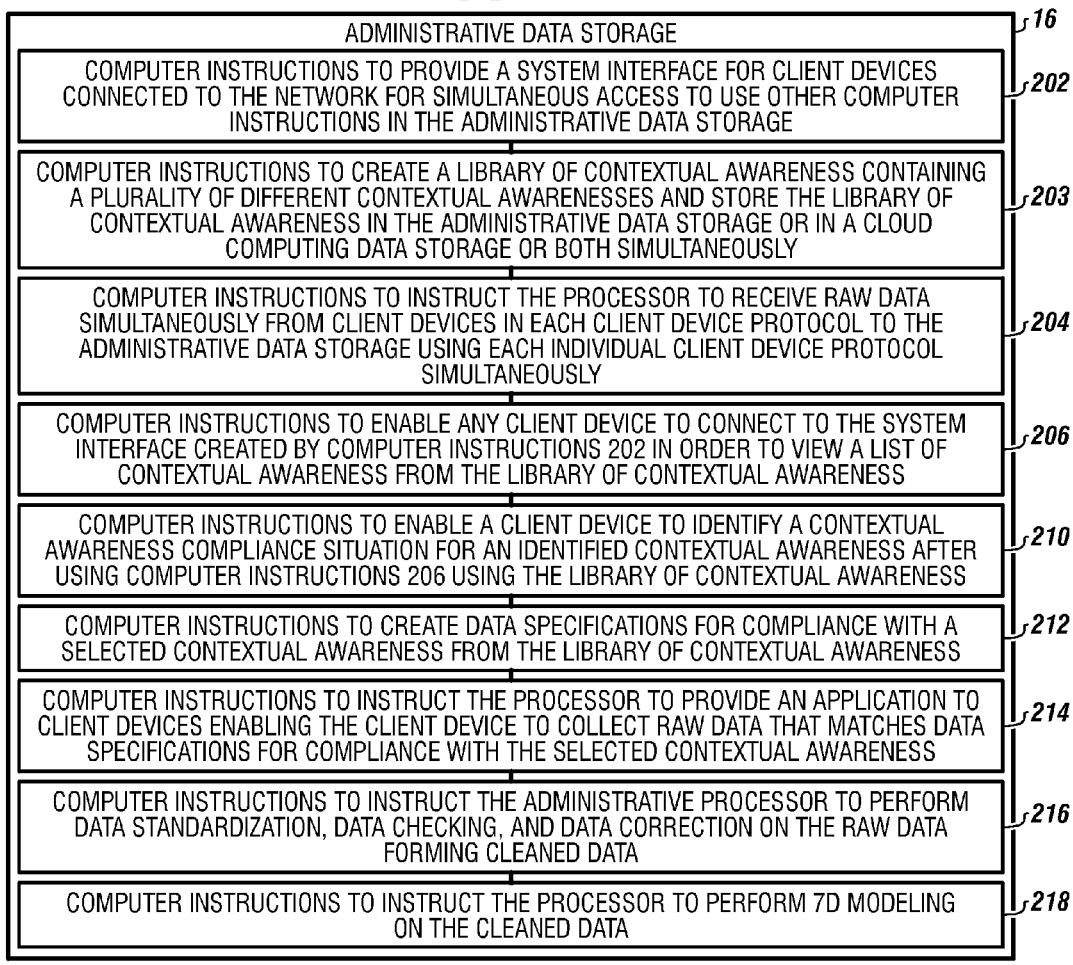
FIG. 2 depicts an administrative data storage containing computer instructions usable to implement the method.

FIG. 2 depicts an administrative data storage containing computer instructions usable in the method.

The administrative data storage 16 can include computer instructions to provide a system interface for client devices connected to the network for simultaneous access to use other computer instructions in the administrative data storage 202.

The administrative data storage 16 can include computer instructions to create a library of contextual awareness containing a plurality of different contextual awarenesses and store the library of contextual awareness in the administrative data storage or in a cloud computing data storage or both simultaneously 203.

The library of contextual awareness can include: types of awareness for specific issues predefined by an administrator, such as medical contextual awareness, financial contextual awareness, political contextual awareness, or economic contextual awareness. The library can also include government regulations connected to each of the types of awareness for a specific issue. For example, government regulations on gender issues can be linked to medical contextual awareness that is gender related. Government regulations on age discrimination can be linked to economic contextual awareness regarding unemployment in a certain geographic zone. The library of contextual awareness can include demographic information on a geographically defined population.

The administrative data storage 16 can include computer instructions to instruct the processor to receive raw data simultaneously from client devices in each client device protocol to the administrative data storage using each individual client device protocol simultaneously 204.

The administrative data storage 16 can include computer instructions enable any client device to connect to the system interface created by computer instructions 202 in order to view a list of contextual awareness from the library of contextual awareness 206.

The administrative data storage 16 can include computer instructions enable a client device to identify a contextual awareness compliance situation for an identified contextual awareness after using computer instructions 206 using the library of contextual awareness 210.

The administrative data storage 16 can include computer instructions 212 to create data specifications for compliance with a selected contextual awareness from the library of contextual awareness 212.

The administrative data storage 16 can include computer instructions to instruct the processor to provide an application to client devices enabling the client device to collect raw data that matches data specifications for compliance with the selected contextual awareness 214.

The administrative data storage 16 can include computer instructions to instruct the administrative processor to perform data standardization, data checking, and data correction on the raw data forming cleaned data 216.

The administrative data storage 16 can include computer instructions to instruct the processor to perform 7D modeling on the cleaned data 218.

FIG. 3 depicts a data storage containing computer instructions which can be used by the administrative processor to perform the 7D modeling steps of the method.

The administrative data storage 16 can include computer instructions to identify single data points from the cleaned data created with computer instructions 218 which is termed "1D data modeling" herein 302.

The administrative data storage 16 can include computer instructions to identify multiple single data points from the cleaned data which is termed "2D data modeling" 304.

The multiple single data points can include data points that identify geo-demographic zones, data points that identify geographic zones, data points that identify zones formed using spatial relationships, and combinations thereof.

The administrative data storage 16 can include computer instructions to identify patterns of contextual awareness which is termed "3D data modeling" herein, from the cleaned data that has been subjected to 2D data modeling 306.

The patterns to be identified can be: concentrations of different contextual awareness, quantities of similar contextual awareness, prevalence of contextual awareness by geographic area, gender, race, political stability, financial stability and combinations thereof.

The administrative data storage 16 can include computer instructions to identify recurrences over time of the patterns of contextual awareness, which are termed herein "4D data modeling" 308.

The recurrences over time of the patterns of contextual awareness can include: (a) a frequency of similar or different contextual awareness, (b) a duration of contextual awareness, (c) a direction of events related to contextual awareness, or combinations thereof.

The administrative data storage 16 can include computer instructions to perform issue disassembly and reassembly over time analysis, which is termed "5D data modeling" 310.

The administrative data storage 16 can include computer instructions to produce a visualization of predictive trends and patterns for the contextual awareness compliance which is termed "6D data modeling" 312.

The administrative data storage 16 can include computer instructions to sort the predictive trends and patterns using the cleaned data from the prior 1D to 6D data modeling, which is termed "7D data modeling" 314.

In an embodiment, the administrative data storage 16 can include computer instructions to identify a contextual awareness from a library of contextual awareness by further using job forms that allow stakeholders to provide information on contextual awareness available using the form and a drop down list of contextual awareness compliances 316.

The administrative data storage 16 can include computer instructions to identify contextual awareness compliances using data gathered from government agencies related to governmental regulations, from stake holders related to stakeholder procedures, stakeholder priorities, and combinations thereof 318. Computer instructions 318 can use data gathered related to industry standards, including quasi-governmental body standards, concerning community promulgated standards, and combinations thereof.

In an embodiment, the administrative data storage 16 can include computer instructions to use data specifications related to contextual awareness compliance situations, wherein the data specifications are entered in real time from a plurality of client devices simultaneously, the data specifications are entered from a third party database containing raw data pertaining to the contextual awareness, or combinations thereof 320.

In an embodiment, the administrative data storage 16 can include computer instructions to obtain and store raw data that originates from: an answer to an inquiry, an observation, a document that records a contextual awareness event, research data, or combinations thereof 322.

In an embodiment, the administrative data storage 16 can include computer instructions to perform data standardization on cleaned data that has at least been subjected to 2D data modeling that further (i) sorts the raw data to data within a preset limits set by an entity, forming sorted raw data; and (ii) converts the sorted raw data to a common format forming a dataset, and (ii) compares datasets 324.

In an embodiment, the administrative data storage 16 can include computer instructions to perform data checking and data correction on the raw data using an algorithm that: (a) sorts for duplicate raw data; (b) compares raw data for mistyped entries; (c) compares raw data for missing entries; and (d) makes a request for corrected data when a mistyped entries or missing data has been identified 324.

FIG. 4A depicts the disassembly and re-assembly sequences usable by computer instructions of the method.

To perform computer instructions 310, the administrative processor can use computer instructions to identify stakeholder relationships which interact with an identified contextual awareness 402, which can be in the administrative data storage 16.

To perform computer instructions 310, the administrative processor can use computer instructions to sort contextual awareness chronologically to identify external issues related to contextual awareness compliance, and identify external issues by causal relationships using a library of contextual awareness 404, which can be in the administrative data storage 16.

FIG. 4B shows the 7D data modeling sequences usable by computer instructions of the method.

To perform computer instructions 314, the administrative processor can use computer instructions to identify stakeholders for creating contextual awareness compliance for each contextual awareness 406, and computer instructions to identify tasks to reach contextual awareness compliance for each contextual awareness 408, which can be in the administrative data storage 16.

To perform computer instructions 314, the administrative processor can use computer instructions to identify resources required for tasks to reach contextual awareness compliance for each contextual awareness 410, which can be in the administrative data storage 16.

To perform computer instructions 314, the administrative processor can use computer instructions to create an integrated, composite decision plan with sorted and prioritized actions identified by task, the stakeholders needed, and resources needed to achieve contextual awareness compliance 412, which can be in the administrative data storage 16.

Figure 5:
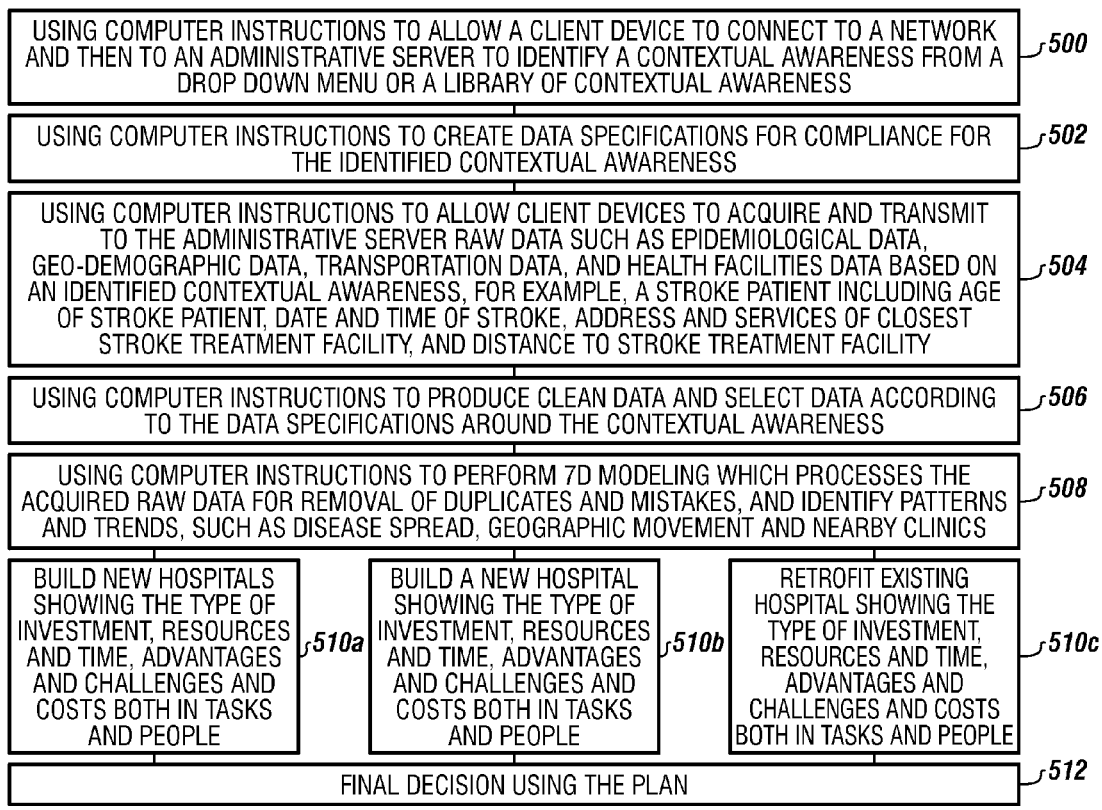
FIG. 5 shows an integrated composite decision plan produced according to the invention.

FIG. 5 shows the method leading up to an integrated composite decision plan with three options produced according to an embodiment of the method. The decision plan can include the steps that the computer instructions perform in general to create three specific options allowing stakeholders to make a decision.

The method can include using computer instructions to allow a client device to connect to a network and then to an administrative server to identify a contextual awareness from a drop down menu or a library of contextual awareness, as shown in step 500.

The method can include using computer instructions to create data specifications for compliance for the identified contextual awareness, as shown in step 502.

The method can include using computer instructions to allow client devices to acquire and transmit to the administrative server raw data such as epidemiological data, geodemographic data, transportation data, and health facilities data based on an identified contextual awareness, for example, a stroke patient including age of stroke patient, date and time of stroke, address and services of closest stroke treatment facility, and distance to stroke treatment facility, as shown in step 504.

The method can include using computer instructions to produce clean data and select data according to the data specifications around the contextual awareness, as shown in step 506.

The method can include using computer instructions to perform 7D modeling which processes the acquired raw data for removal of duplicates and mistakes, and identify patterns and trends, such as disease spread, geographic movement and nearby clinics, as shown in step 508. The 7D modeling can also create a visualization of the information such as in tables, figures, or 3D drawings, which can be pushed to client devices for viewing by users or stakeholders of the contextual awareness.

The computer instructions of step 508 can include identifying areas with higher concentrations of stroke victims in the future and in the present, and find associated facilities for these victims.

The result of the computer instructions using the 7D modeling of step 508 are shown as three options, option 510a, option 510b and option 510c.

In the 7D calculation step, the data can be sorted and modeled using computer instructions to identify a variety of patterns, and trends, such a temporal shifts or geographic movement relative to other contextual awareness data. In the fact-based options with task/people sorting and implications mapping step, patterns, trends and other output from 7D modeling can be organized into options for comparison among such factors as investments of resources and time, relative advantages and disadvantages, and costs relating to task and people expenditures and burdens.

Three options 510a, 510b and 510c can be identified using the computer instructions of the method. In the decision step 512, the end users can deliberate the options and select one option for action.

Option 510a can be build new hospitals showing the type of investment, resources and time, advantages and challenges and costs both in tasks and people.

Option 510b can be build a new hospital showing the type of investment, resources and time, advantages and challenges and costs both in tasks and people.

Option 510c can be retrofit existing hospital showing the type of investment, resources and time, advantages and challenges and costs both in tasks and people.

Each option is scored relative to one another on these factors, including costs for equipment, training, construction, salary, and productivity.

After reviewing the available options the end users can make a final decision using the plan, as shown in step 512.

Figure 6A:
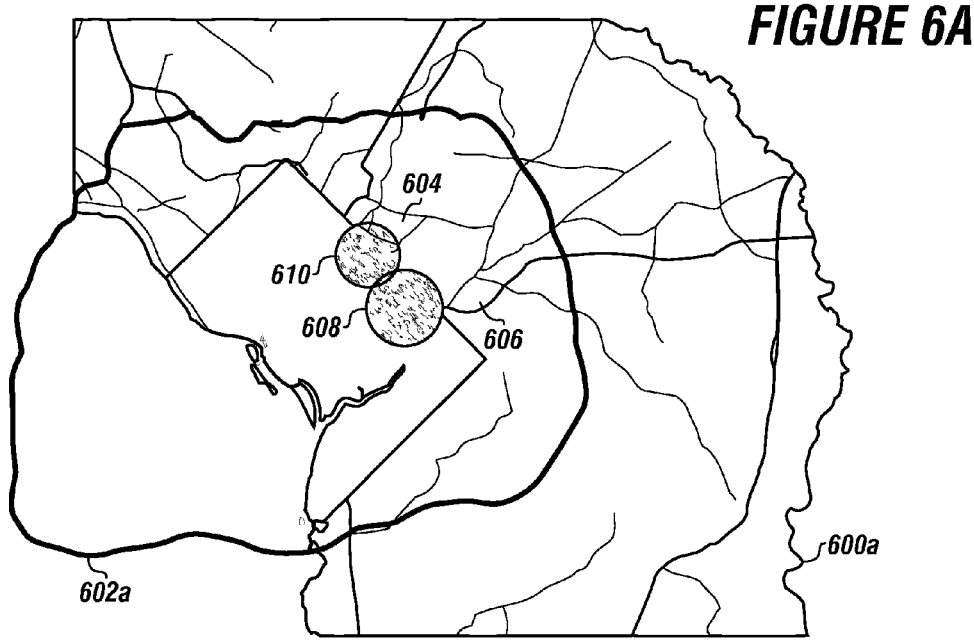
FIG. 6A is a depiction of a first zone map created for medical condition forecasting and mapping awareness in a first year.
Figure 6B:
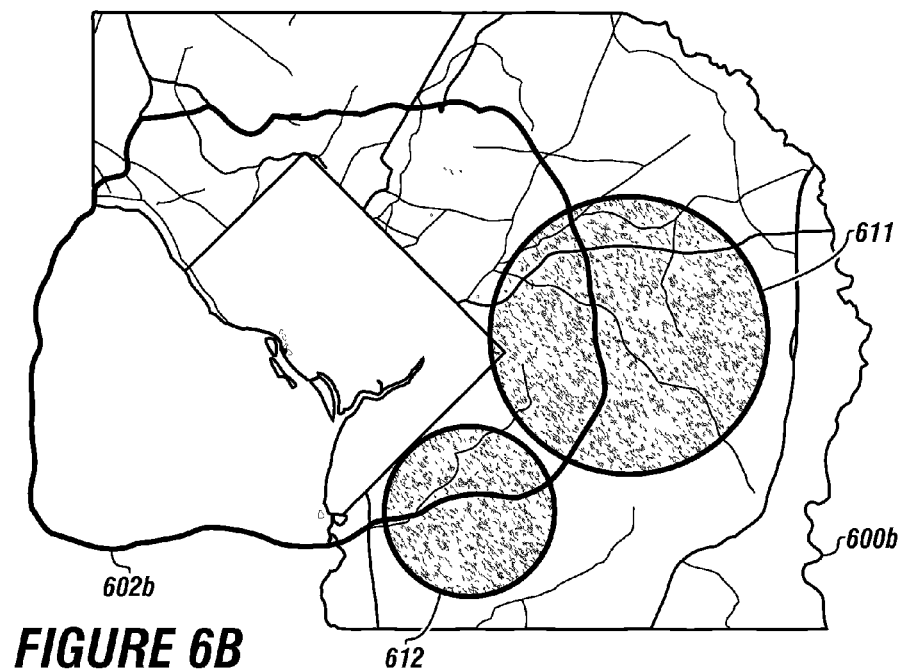
FIG. 6B is a prophetic zone map of the contextual awareness of FIG. 6A for a later year using the method.

FIG. 6A is a depiction of a first zone map created for a contextual awareness in a first year and FIG. 6B is a prophetic zone map of the same contextual awareness for a later year using the method.

FIG. 6A shows the geographic area of interest 600a in 1970.

Within the geographic area of interest 600a is a population susceptible to stroke 602a, which is African-American males aged 45-64 in 1970.

Element 604 (H1) depicts a location of an emergency care facility.

Element 606 (H2) depicts a location of another emergency care facility.

Zone 1, a center of population in 1970, is element 610.

Zone 2, a center of population in 1970, is element 608.

FIG. 6B shows the same geographic area of interest 600b in 2030 for the same population susceptible to stroke 602b which is African-American aged 45-64.

Element 611 (H3) depicts a location of an emergency care facility.

Element 612 (H4) depicts a location of an emergency care facility.

Zone 3 coincides with H3 as element 611 in this model after 7D modeling was used.

Zone 4 coincides with H4 as element 612 in this model after 7D modeling was used.

This Figure is a visualization of the results achieved by this computer assisted method. The zones can be formed using geo-spatial analysis, wherein computer instructions used in 7D modeling calculated the relationship of stroke concentration to hospital facility data. In this example. Zones 1 and 2 refer to a spatial relationship of concentrations of an at-risk population in the year 1970. H1 and H2 represent the location of hospitals. Zones 3 and 4 refer to an updated spatial relationship of concentrations of the at-risk population in a future year, such as the year 2030, and H3 and H4 represent the location of proposed new hospitals needed to handle the prophetic contextual awareness.

The zones depict high concentrations of the at-risk for stroke population of African American males in a study area. The H1 and H2 symbols show the location of hospitals. Zone 1 and Zone 2 show the locations of the highest concentrations of the at-risk population in the year 1970. Zone 3 and Zone 4 show the projected locations of the highest risk concentrations of the at-risk population in the year 2030. The year 2030 projections indicate that the highest concentrations of the at-risk population will have moved geographically, and cover larger territories. The movement of the Zones suggested that hospitals to serve the needs of the at-risk populations are needed in new locations identified by H3 and H4. The process revealed a change in need and provided recommendations for options to respond to the changing need.

EXAMPLE

Mr. Smith, an African American male age 51 who is also a hospital administrator, has the responsibility to determine the projected clinical need in 10 years for emergency stroke treatment and prevention outreach among African American males in Prince Georges County, Maryland.

Mr. Smith falls within the category of males in the U.S. with a higher degree of susceptibility to stroke, so his contextual awareness of the subject matter is valuable in determining what are considered appropriate data inputs and what would be appropriate decision making options to address this concern.

Mr. Smith desires to dynamically map collaborative data to make decisions on hospitals needed; Mr. Smith seeks the embodiment of this invention to help in decision making.

The first thing Mr. Smith does is to use his laptop from his office to access a system interface provided in the data storage connected to the administrative processor.

Next, Mr. Smith asks the system interface to provide raw data from an array of sources connected to the network in the protocol of the client devices of those sources simultaneously such as a geo-demographic database, stroke case history database and a geographic location database which are connected by a server via the internet and connected by a laptop.

Mr. Smith uses the system interface to identify a contextual awareness and select it via a dropdown menu interface from a library of contextual awareness resident in the administrative data storage.

Mr. Smith is interested in raw data that includes epidemiological data relating to incidents of stroke, such as date and time of incident, age and gender of the patient, location of treatment, method of arriving at treatment facility, treatment, treatment results, such as survival or fatality, and patient's other health data.

Mr. Smith uses the system interface to collect geo-demographic data to determine compliance situations for the identified contextual awareness termed data mining or dataset identification.

Mr. Smith accumulates current and 10-year projected data on race/ethnicity, age, gender, income, marital status, and presence of children.

Mr. Smith requests and receives raw data that includes educational attainment, employment type, employment status, primary language, and media and communication habits at the census tract level of geography.

Mr. Smith uses computer instructions in the administrative data storage to form data specifications for the contextual awareness situations and specifically to create small-area and larger area patterns of needs, such as health care facilities and prevention and response education activities.

Once his data specifications are created, Mr. Smith uses computer instructions in the administrative data storage to add information about the population, including transportation data of the study area, such as current and 10-year projected transportation routes and transit networks to include roads, transit rail and bus routes/stops, and travel times.

Mr. Smith additionally collects information on health care facilities in the study area, such as locations of facilities with ability to treat stroke patients in emergency and preventative capacities.

Once the raw data is collected, Mr. Smith uses computer instructions to perform data standardization, data checking and data correction.

Mr. Smith performs this data standardization by identifying common data characteristics between data such as neighborhood or age range, performs data checking by verifying the data are usable by the processor algorithms, formatted correctly, and performs data correction by testing single data for errors such as missing data fields, duplicate data fields, or data outside the particular age range or geographic zone to produce cleaned data.

Mr. Smith uses data that has been cleaned and normalized for comparative purposes. Since the raw data comes from many sources and in different forms, and for it to be optimally utilized, it is rigorously checked for any omissions, consistency, accuracy and relevance in support of contextual awareness related to the topic, such as stroke in African-American males. This checking is performed by software algorithms that are specifically designed to validate the data, based on factors determined by the stakeholders and in conjunction with their contextual awareness.

When reviewing data sources associated with numerous incidents of stroke over a span of time, such as one, five, or ten years; specifications; processes; and content of the collected data must be made consistent allowing each to be compared one from the other. Additional important consistencies and quality factors of the source data include their being in the geographic study area, plus containing complete and accurate information associated with age and gender.

Once the data becomes "cleaned data" the cleaned data is submitted into the 7D Modeling, a disciplined, systematic analysis that processes the cleaned data.

For Mr. Smith, single data points from the cleaned data including location, ethnicity, gender and age are obtained.

Next, Mr. Smith identifies multiple internal data points. For example, he uses computer instructions in the data storage to determine geo-demographic zones, such as neighborhoods and proximity to industrial hubs or city centers for the African American males that are in the defined age range and subject to stoke within a 10 miles radius of a proposed stroke clinic location.

Mr. Smith also generates geographic zones forming using spatial relationships between existing foci of African American stroke victims and a future projected location of stroke victims. He views the geographic zones by reviewing trend data regarding migration of populations over a period of time. Other examples of spatial relationships can include noting the current locations of stroke clinics that can provide prevention and response education activities and the future projected needs at new locations.

Next Mr. Smith requests the computer instructions in the data storage to identify patterns of contextual awareness from the data points wherein the patterns consist of concentrations of stroke victims at different points in time or among different income groups.

Additionally, Mr. Smith generates quantities of similar contextual awareness such as available transportation to the nearest clinics and the future projected needs for transportation to clinics.

Mr. Smith uses computer instructions in the data storage to generate a prevalence of contextual awareness by geographic area, namely availability of prevention and response education activities focused on reaching the African American male potential stroke population.

Mr. Smith uses computer instructions to indicate prevalence of contextual awareness by the male gender and the African American race.

Thus the 7D modeling evaluates data type and identifies patterns associated with a data type.

Mr. Smith asks for patterns based on financial stability, such as availability of funding organizations in the contextual awareness areas of interest and on political stability, such as interest and support of local leaders for new facilities and/or prevention and response education activities.

For Mr. Smith, by identifying recurrences over time of the patterns of contextual awareness, Mr. Smith can see where incidents of stroke can be related to patient epidemiological and geo-demographic data, and the proximity and ease of access to transportation and health care facilities in the study area. This information enables discoveries of patterns, such as geographically, where the number of stroke incidents is increasing on a per-capita and/or volume bases, and how time-to-treatment is changing to allow stakeholders to readily explore questions and options.

That is, Mr. Smith can identify recurrences of contextual awareness consisting of frequency of similar or different contextual awareness, such as an increase of strokes in younger age groups, duration of contextual awareness, such as stroke exacerbated by high job stress, and direction of events related to contextual awareness, such as increased stroke victims in high density urban work environments.

Data alone provides a limited use for stakeholders to understand the situation, science and analysis associated with determining the clinical needs for emergency stroke treatment and prevention outreach among African American males. The 6D phase outputs a series of charts, reports, maps, animations and three-dimensional renderings that show the patterns of strokes in the study area and allow the stakeholders to more readily understand completely the information contained in the very precise, comprehensive and complex analytical datasets.

Finally, the information is processed and analyzed using computer instructions that perform issue disassembly and reassembly over time.

Mr. Smith uses computer instructions to produce and sort predictive trends and patterns of strokes in the study area as a final output. The review of this output involves identifying stakeholder relationship that interact with stroke contextual awareness. Mr. Smith engages in a collaborative manner with stakeholders in the analysis and prioritization of an integrated composite decision plan.

Mr. Smith uses the computer instructions to sort and prioritize actions identified by tasks, the stakeholders and resources needed to achieve contextual awareness compliance.

This prioritization effort enables identification of resources required for tasks to reach contextual awareness compliance for African American stroke victims, and provides options for potential locations of treatment and prevention facilities and activities, estimates of the number of patients, and patient travel times to various health facilities for stroke incidents.

Stakeholders will be able to consider the range of options and add numerical scores for financial, political, and other factors to further analyze the potential implications of pursuing the top-ranking stroke prevention and response options provided by this analysis.

The analysis will offer a number of useful options to choose. For example, Mr. Smith and his supporting stakeholders may now choose to retro-fit existing facilities or to construct one or more new stroke-care facilities, and/or to train current facility personnel and related first-responder personnel in stoke treatment.

The final step of the computer implemented method allows Mr. Smith using computer instructions to generate an integrated composite decision plan with sorted and prioritized actions identified by task, identifying stakeholders and resources needed to achieve contextual awareness compliance.

For example, for Mr. Smith's plan, the following actions of prevention and response education activities and treatment facilities are needed. The above actions have multiple tasks and require a range of stakeholders. Both public and private resources are needed to achieve contextual awareness compliance.

In another embodiment, the computer assisted method for accelerated planning and dynamic mapping a contextual awareness and creating an integrated composite decision plan can use a plurality of client devices, an administrative processor and data storage connected to a network and a plurality of computer instructions.

In this embodiment, the administrative processor connected to administrative data storage contains computer instructions to perform a computer assisted geospatial analysis to create an integrated composite decision plan.

The computer assisted method can use computer instructions in the administrative data storage to create a system interface; wherein the computer instructions simultaneously connect together a plurality of client devices, and a third party provider via a network to computer instructions in the administrative data storage using the administrative processor to register a client device and provide a system interface to request and store data from the third party provider.

The computer assisted method can use computer instructions in the administrative data storage and the system interface to identify a contextual awareness; including computer instructions to identify a contextual awareness using key words, classification codes, priority codes, or combinations thereof, and computer instructions that list various economic, gender related, medical, and political situational awareness linked to those key words, classification codes, priority codes using a library of contextual awareness stored in the administrative data storage.

The computer assisted method can use computer instructions in the administrative data storage and the client devices to collect raw data on the contextual awareness; wherein the computer instructions to collect the raw data comprise information from a member of the group: gender, age, transportation facilities, health care facilities, first responder facilities, educational facilities, road information, housing construction rates, natural disaster patterns, security information, and combinations thereof.

The computer assisted method can use computer instructions in the administrative data storage to store the collected raw data in the administrative data storage linked to the identified contextual awareness using the plurality of client devices in a plurality of client device protocols simultaneously.

The computer assisted method can use computer instructions in the administrative data storage to perform geospatial analysis on the collected raw data for the identified contextual awareness using a library of contextual awareness and computer instructions to perform the geospatial analysis.

The computer assisted method can use computer instructions that request compliance standards from a third party provider via the network for the identified contextual awareness, wherein the compliance standards from the third party provider are in a dynamic electronic library of searchable fields including best practices for a contextual awareness, materials specification standards for the contextual awareness, government standards for the contextual awareness from codes of federal regulation; government standards for the contextual awareness from other state, municipal, regulations; community promulgated standards for the contextual awareness.

The computer assisted method can use computer instructions to form data specifications to achieve contextual awareness compliance for the identified contextual awareness wherein the computer instructions project potential need for over a period of time for the identified contextual awareness using a projected need for specific facilities, equipment, disposable materials, personnel, transportation and other related resources related to the identified contextual awareness.

The computer assisted method can use computer instructions to match raw data to the data specifications for compliance enabling the identification of existing facilities, existing equipment, existing disposable materials, existing personnel, existing transportation, existing other related resources related to the identified contextual awareness for use to achieve contextual awareness compliance with the data specifications.

The computer assisted method can use computer instructions that perform data standardization, data checking, and data correction on the raw data to form cleaned data.

The computer assisted method can use computer instructions that use the cleaned data with the data specifications for compliance to calculate quantity, type and date of need for future facilities, future equipment, future disposable materials, future personnel, future transportation, future other related resources to meet data specifications for compliance for the identified contextual awareness; wherein the calculations are made using computer instructions to perform predictive dynamic decision plan modeling for the identified contextual awareness.

The computer assisted method can use computer instructions to identifying single data points from the cleaned data.

The computer assisted method can use computer instructions to identify multiple internal data points from the cleaned data, wherein the multiple data points include geo-demographic zones, geographic zones, and zones formed using spatial relationships, and combinations thereof.

The computer assisted method can use computer instructions to identify patterns of contextual awareness from the cleaned data wherein the patterns consist of: concentrations of different contextual awareness, quantities of similar contextual awareness, prevalence of contextual awareness by geographic area, gender, race, political stability, financial stability and combinations thereof.

The computer assisted method can use computer instructions to identify recurrences over time of the patterns of contextual awareness, wherein the recurrences of contextual awareness over time consisting of: (a) frequency of similar or different contextual awareness, (b) duration of contextual awareness, (c) direction of events related to contextual awareness, or combinations thereof.

The computer assisted method can use computer instructions that perform issue disassembly and reassembly over time analysis.

The computer assisted method can use computer instructions to identify stakeholders which interact with one of the identified contextual awareness.

The computer assisted method can use computer instructions to sort contextual awareness chronologically to identify external issues related to contextual awareness compliance, and identify external issues by causal relationships using a Library of Contextual Awareness in the administrative storage.

The computer assisted method can use computer instructions to produce visual outputs from the administrative data storage to visualize predictive trends and patterns for the contextual awareness compliance.

The computer assisted method can use computer instructions to transmit to stakeholders for collaborative decision making: the identified tasks to reach contextual awareness compliance for each contextual awareness; identify resources required for tasks to reach contextual awareness compliance for each contextual awareness.

The computer assisted method can use computer instructions that allow the stakeholders to create an integrated, composite decision plan with sorted and prioritized actions identified by task, the stakeholders needed, and resources needed to achieve contextual awareness compliance.

While these embodiments have been described with emphasis on the embodiments, it should be understood that within the scope of the appended claims, the embodiments might be practiced other than as specifically described herein.

What is claimed is:

1. A computer assisted method for accelerated planning and dynamic graphical mapping of a contextual awareness and creating an integrated composite decision plan using a plurality of client devices, an administrative processor and an administrative data storage connected to a network, and a plurality of computer instructions, the computer assisted method comprising:

a. using an administrative data storage connected to an administrative processor and a network, and a plurality of client devices wherein the client devices are selected from the group: a cell phone, a laptop, a computer, and a tablet, to provide input when connected to the network to enable the administrative processor to perform a computer assisted geospatial analysis and create an integrated composite decision plan;

b. using computer instructions in the administrative data storage to instruct the administrative processor to create a system interface; wherein the computer instructions simultaneously connect together the plurality of client devices, and a third party provider via the network to computer instructions in the administrative data storage using the administrative processor to register a client device and provide a system interface to request and store data from the third party provider;

c. using computer instructions in the administrative data storage to instruct the administrative processor and computer instructions in the system interface to instruct the administrative processor to identify a contextual awareness; wherein the computer instructions identify the contextual awareness using key words, classification codes, and priority codes, and computer instructions that list situational awareness linked to the key word, classification code, and priority codes using a library of contextual awareness stored in the administrative data storage;

d. using computer instructions in the administrative data storage to instruct the administrative processor and computer instructions in the client devices to instruct the administrative processor to collect raw data on the contextual awareness; wherein the computer instructions to collect the raw data comprise information from a member of the group: transportation facilities, health care facilities, first responder facilities, educational facilities, and combinations thereof;

e. using computer instructions in the administrative data storage to instruct the administrative processor to store the collected raw data in the administrative data storage linked to the identified contextual awareness using the plurality of client devices in a plurality of client device protocols simultaneously; and f. using computer instructions in the administrative data storage to instruct the administrative processor to perform geospatial analysis on the collected raw data for the identified contextual awareness using the library of contextual awareness; wherein the computer instructions to perform the geospatial analysis consist of:

(i) computer instructions to instruct the administrative processor to request compliance standards from a third party provider via the network for the identified contextual awareness, wherein the compliance standards from the third party provider are in a dynamic electronic library of searchable fields including best practices for a contextual awareness, materials specification standards for the contextual awareness, government standards for the contextual awareness from codes of federal regulation, government standards for the contextual awareness from other state, municipal, regulations, and community promulgated standards for the contextual awareness;

(ii) computer instructions to instruct the administrative processor to form data specifications to achieve contextual awareness compliance for the identified contextual awareness wherein the computer instructions provide a projection of need for a geographic area for over a defined period of time for the identified contextual awareness using a projected use for facilities, equipment, disposable materials, personnel, transportation and related resources related to the identified contextual awareness;

(iii) computer instructions to instruct the administrative processor to match the collected raw data to the data specifications for compliance enabling the identification of a location specific to existing facilities, existing equipment, existing disposable materials, existing personnel, existing transportation, and existing other related resources related to the identified contextual awareness for use in achieving contextual awareness compliance with the data specifications;

(iv) computer instructions to instruct the administrative processor to perform data standardization, data checking, and data correction on the collected raw data to form cleaned data; and (v) computer instructions to instruct the administrative processor to use the cleaned data with the data specifications for compliance to calculate quantity of facilities needed and type of facilities needed, for the geographic area given the identified contextual awareness, quantity of equipment needed, quantity of disposable materials needed, quantity of personnel needed, and transportation needed for the geographic area, to meet data specifications for compliance for the identified contextual awareness; wherein the calculations are determined using computer instructions that calculate predictive dynamic decision plan modeling for the identified contextual awareness consisting of:

a. computer instructions to instruct the administrative processor to identify single data points from the cleaned data for the geographic area;

b. computer instructions to instruct the administrative processor to identify multiple internal data points from the cleaned data, wherein the multiple data points include geo-demographic zones, geographic zones, and zones formed using geographic spatial relationships;

c. computer instructions to instruct the administrative processor to identify patterns of contextual awareness from the cleaned data wherein the patterns consist of concentrations of different contextual awareness, quantities of contextual awareness, and prevalence of contextual awareness by the geographic area;

d. computer instructions to instruct the administrative processor to identify recurrences over time of the patterns of contextual awareness, wherein the recurrences of contextual awareness over time consist of: (a) frequency of contextual awareness, (b) duration of contextual awareness, and (c) past, present or future direction of events related to contextual awareness;

e. computer instructions to instruct the administrative processor to perform issue disassembly and reassembly over time analysis;

f. computer instructions to instruct the administrative processor to identify stakeholders which interact with one of the identified contextual awareness;

g. computer instructions to instruct the administrative processor to sort contextual awarenesses chronologically to identify external issues related to contextual awareness compliance, using the library of contextual awareness in the administrative data storage;

h. computer instructions to instruct the administrative processor to produce visual outputs from the administrative data storage to display predictive trends and patterns for the contextual awareness compliance using the cleaned data;

i. computer instructions to instruct the administrative processor to transmit to stakeholders for collaborative decision making: tasks to reach contextual awareness compliance for each contextual awareness; and to identify resources required for tasks to reach contextual awareness compliance for each contextual awareness; and j. computer instructions to instruct the administrative processor to enable the stakeholders to create an integrated, composite decision plan with geographically sorted and prioritized actions identified by task, by quantity of the stakeholders needed, and by the resources needed to achieve contextual awareness compliance creating an integrated composite decision plan for: geographically defined facilities, equipment, disposable materials, personnel, and transportation.

2. The method of claim 1, further comprising: using computer instructions in the administrative data storage to instruct the administrative processor to identify a contextual awareness from a library of contextual awareness resident in the administrative data storage using job forms that allow stakeholders to provide information on contextual awareness available via a drop down list of contextual awareness compliances.

3. The method of claim 2, further comprising using computer instructions in the administrative data storage to instruct the administrative processor to identify contextual awareness compliances using raw data gathered from government regulations, stakeholder procedures, stakeholder priorities, industry standards, quasi-governmental body standards, and community promulgated standards.

4. The method of claim 1, further comprising using computer instructions in the administrative data storage to instruct the administrative processor to create data specifications for each contextual awareness compliance situation, wherein the data specifications are entered in real time from a plurality of client devices simultaneously, and data from a third-party database containing raw data pertaining to the contextual awareness.

5. The method of claim 1, further comprising using computer instructions in the administrative data storage to instruct the administrative processor to acquire raw data that originates from the client devices that consists of: an answer to an inquiry, an observation, a document that records contextual awareness events, and research data.

6. The method claim 1, further comprising using computer instructions in the administrative data storage to instruct the administrative processor to perform data standardization that:

a. sorts the collected raw data to data within a preset limit set by a user forming sorted raw data; and b. converts the collected raw data to a common format forming datasets, and which allows comparison between datasets.

7. The method of claim 1, further comprising using computer instructions in the administrative data storage to instruct the administrative processor to perform data checking and data correction on the collected raw data using an algorithm that:

a. sorts for duplicate data;

b. compares data for mistyped entries;

c. compares data for missing entries; and d. requests a user to insert corrected data for mistyped entries or missing data.

8. The method of claim 1, wherein the computer instructions that list situational awareness use situational awarenesses from the library of contextual awareness which are economic awarenesses.

9. The method of claim 1, wherein the computer instructions that list situational awareness use situational awarenesses from the library of contextual awareness which are gender awarenesses.

10. The method of claim 1, wherein the computer instructions that list situational awareness use situational awarenesses from the library of contextual awareness which are medical awarenesses.

11. The method of claim 1, wherein the computer instructions that list situational awareness use situational awarenesses from the library of contextual awareness which are political awarenesses.

12. The method of claim 1, further comprising using computer instructions to collect other raw data on genders of a population within the geographic area.

13. The method of claim 1, further comprising using computer instructions to collect other raw data on ages in a population within the geographic area.

14. The method of claim 1, further comprising using computer instructions to collect other raw data on road information on the geographic area.

15. The method of claim 1, further comprising using computer instructions to collect other raw data on housing construction rates within the geographic area.

16. The method of claim 1, further comprising using computer instructions to collect other raw data on natural disaster patterns within the geographic area, and security information for the geographic area.

\* \* \* \* \*